(12) United States Patent
Ikuta

(10) Patent No.: US 7,604,071 B2
(45) Date of Patent: Oct. 20, 2009

(54) POWER TOOL WITH VIBRATION REDUCING MEANS

(75) Inventor: Hiroki Ikuta, Anjo (JP)

(73) Assignee: Makita Corporation, Anjo (JP)

( * ) Notice: Subject to any disclaimer, the term of this patent is extended or adjusted under 35 U.S.C. 154(b) by 12 days.

(21) Appl. No.: 11/587,804

(22) PCT Filed: Apr. 26, 2005

(86) PCT No.: PCT/JP2005/007929

§ 371 (c)(1),
(2), (4) Date: Nov. 21, 2006

(87) PCT Pub. No.: WO2005/105386

PCT Pub. Date: Nov. 10, 2005

(65) Prior Publication Data

US 2008/0029282 A1    Feb. 7, 2008

(30) Foreign Application Priority Data

Apr. 30, 2004   (JP)   ............... 2004-135604

(51) Int. Cl.
*B25D 9/00* (2006.01)
(52) U.S. Cl. ............... 173/162.1; 173/122; 173/210; 173/162.2
(58) Field of Classification Search .......... 173/162.1, 173/122, 210, 162.2, 217; 403/225
See application file for complete search history.

(56) References Cited

U.S. PATENT DOCUMENTS

| | | | | |
|---|---|---|---|---|
| 2,608,118 A * | 8/1952 | Disser | .................. | 173/93.6 |
| 2,632,331 A * | 3/1953 | Pinazza | .................. | 74/61 |
| 2,875,731 A | 3/1959 | Settles et al. | | |
| 3,837,409 A * | 9/1974 | Consoli et al. | .................. | 173/48 |
| 4,460,051 A * | 7/1984 | Widmer | .................. | 173/208 |
| 4,478,293 A | 10/1984 | Weilenmann et al. | | |
| 5,678,641 A * | 10/1997 | Manschitz et al. | .................. | 173/114 |
| 6,000,310 A | 12/1999 | Shilkrut et al. | | |
| 6,112,830 A * | 9/2000 | Ziegler et al. | .................. | 173/109 |
| 6,763,897 B2 * | 7/2004 | Hanke et al. | .................. | 173/210 |
| 6,902,012 B2 * | 6/2005 | Kristen et al. | .................. | 173/200 |
| 6,907,943 B2 * | 6/2005 | Ikuta | .................. | 173/117 |
| 6,962,211 B2 * | 11/2005 | Daubner et al. | .................. | 173/162.2 |
| 7,096,973 B2 * | 8/2006 | Ikuta et al. | .................. | 173/201 |
| 7,204,322 B2 * | 4/2007 | Sakai | .................. | 173/162.1 |
| 7,252,157 B2 * | 8/2007 | Aoki | .................. | 173/162.2 |
| 7,287,601 B2 * | 10/2007 | Hellbach et al. | .................. | 173/162.2 |
| 2002/0185288 A1 * | 12/2002 | Hanke et al. | .................. | 173/201 |

(Continued)

FOREIGN PATENT DOCUMENTS

DE          87 08 167 U1     10/1988

(Continued)

*Primary Examiner*—Brian D Nash
(74) *Attorney, Agent, or Firm*—Oliff & Berridge, PLC

(57) ABSTRACT

The invention provides a power tool which includes a tool bit, a first operating mechanism that linearly drives the tool bit and thereby causes the tool bit to perform a predetermined operation, and a dynamic vibration reducer 151 that reduces vibration in the operation of the tool bit. The dynamic vibration reducer includes a weight 153 that can linearly move under the action of biasing forces of a plurality of biasing springs 157 acting upon the weight 153 toward each other. The weight 153 is driven by a second operating mechanism 116 that mechanically excites at least one of the elastic elements, via the elastic element.

14 Claims, 10 Drawing Sheets

U.S. PATENT DOCUMENTS

| | | | |
|---|---|---|---|
| 2003/0006051 A1 | 1/2003 | Schmitzer et al. | |
| 2004/0194986 A1* | 10/2004 | Ikuta | 173/48 |
| 2004/0206520 A1* | 10/2004 | Ikuta | 173/48 |
| 2004/0222001 A1* | 11/2004 | Ikuta et al. | 173/210 |
| 2005/0087353 A1* | 4/2005 | Oki et al. | 173/162.2 |
| 2006/0185867 A1* | 8/2006 | Frauhammer et al. | 173/162.1 |
| 2007/0017684 A1* | 1/2007 | Stirm et al. | 173/109 |
| 2007/0175647 A1* | 8/2007 | Aoki | 173/210 |
| 2007/0289762 A1* | 12/2007 | Kikukchi et al. | 173/162.1 |

FOREIGN PATENT DOCUMENTS

| | | | |
|---|---|---|---|
| EP | 1439038 A1 * | 7/2004 | |
| EP | 1475190 A2 * | 11/2004 | |
| EP | 1779979 A1 * | 5/2007 | |
| GB | 2 129 733 A | 5/1984 | |
| JP | A-52-109673 | 9/1977 | |
| JP | A-57-211482 | 12/1982 | |
| JP | A-61-178188 | 8/1986 | |
| JP | A-01-274973 | 11/1989 | |
| JP | A-2003-039344 | 2/2003 | |
| JP | A-2004-042211 | 2/2004 | |

* cited by examiner

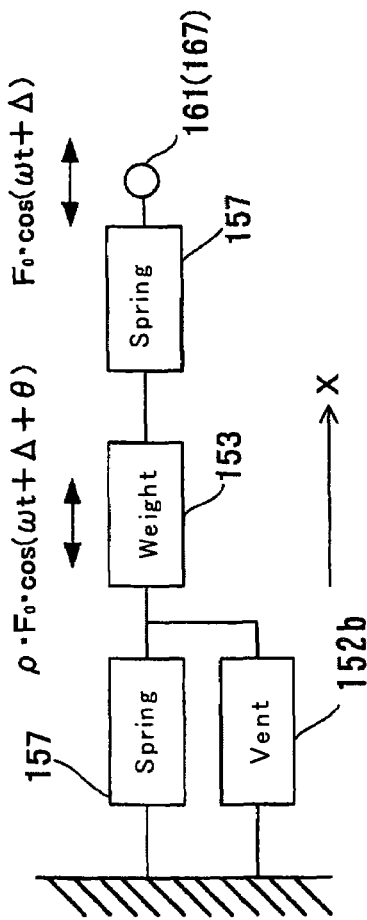

FIG. 4

$$m\frac{d^2x}{dt^2} + c\frac{dx}{dt} + kx = F_0 \cdot \cos(\omega t + \Delta) \quad \cdots (1)$$

$$c = m\gamma \quad \cdots (2)$$

$$k = m\omega_0^2 \quad \cdots (3)$$

$$f_0 = \frac{\omega_0}{2\pi} \quad \cdots (4)$$

$$x = \rho \cdot F_0 \cdot \cos(\omega t + \Delta + \theta) \quad \cdots (5)$$

$$\rho^2 = \frac{1}{m^2\left[\left(\omega_0^2 - \omega^2\right)^2 + \gamma^2\omega^2\right]} \quad \cdots (6)$$

$$\tan\theta = -\frac{\gamma\omega}{\omega_0^2 - \omega^2} \quad \cdots (7)$$

t : Time x : Amplitude of weight 153 m : Mass of weight 153 c : Damping coefficient k : Spring constant of biasing springs 157 f : Excitation frequency $\omega$ : Angular velocity (=$2\pi \cdot f$)

$\theta$ : Phase difference

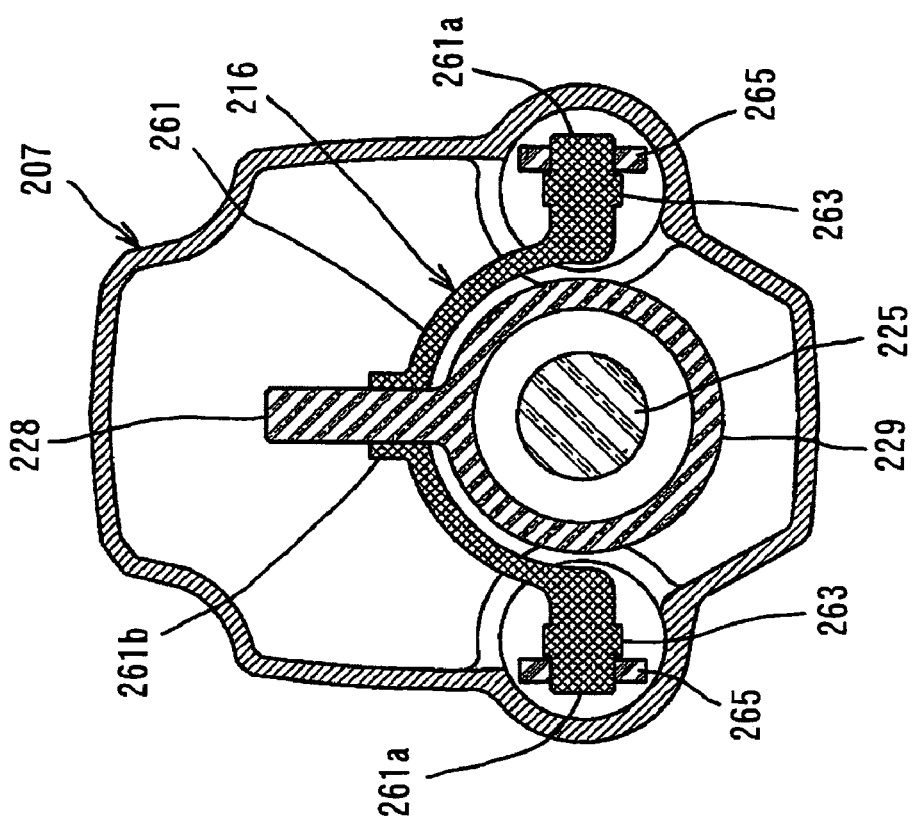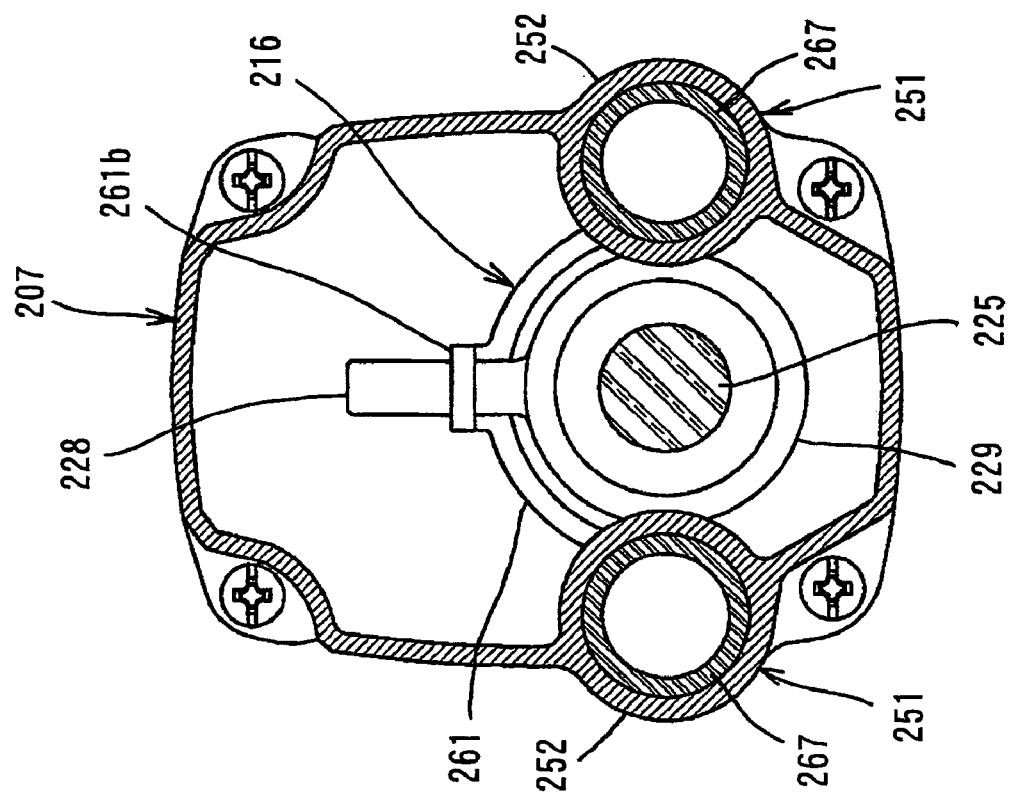

POWER TOOL WITH VIBRATION REDUCING MEANS

FIELD OF THE INVENTION

The present invention relates to a technique for reducing vibration in a power tool, such as a hammer and a hammer drill, which linearly drives a tool bit.

BACKGROUND OF THE INVENTION

Japanese non-examined laid-open Patent Publication No. 52-109673 discloses an electric hammer having a vibration reducing device. In the known electric hammer, a vibration proof chamber is integrally formed with a body housing (and a motor housing) in a region on the lower side of the body housing and forward of the motor housing. A dynamic vibration reducer is disposed within the vibration proof chamber. It is designed such that the dynamic vibration reducer reduces a strong vibration which may be caused in the longitudinal direction of the hammer when the hammer is driven In the above-described dynamic vibration reducer, the weight is disposed under an action of the biasing force of an elastic element. The dynamic vibration reducer performs a vibration reducing function by the weight being driven according to the magnitude of vibration inputted to the dynamic vibration reducer. Specifically, the dynamic vibration reducer has a passive property that the amount of vibration reduction by the dynamic vibration reducer depends on the amount of vibration. In actual operation, a considerable load is applied from the workpiece side to the tool bit, for example, by a user performing the operation while strongly pressing the power tool against the workpiece and therefore, vibration reduction is highly required in such case. However, in some cases, the amount of vibration to be inputted to the dynamic vibration reducer may be reduced.

SUMMARY OF THE INVENTION

Object of the Invention

It is, accordingly, an object of the present invention to provide an effective technique for further improving the vibration reducing performance of a power tool.

Resolution to Solve the Problem

The above-described problem can be solved by the features of claimed invention.

The present invention provides a power tool which includes a tool bit, a first operating mechanism that linearly drives the tool bit and thereby causes the tool bit to perform a predetermined operation, a dynamic vibration reducer that reduces vibration in the operation of the tool bit via a weight that reciprocates under the action of a biasing force of an elastic element, and a second operating mechanism that mechanically excites the elastic element to thereby forcibly drive the weight.

The tool bit typically comprises a hammer bit that performs a hammering operation or a hammer drill operation on a workpiece, or a saw blade that performs a cutting operation on a workpiece.

In the present invention, in a passive vibration reducing mechanism in the form of the dynamic vibration reducer, the weight is actively driven by the second operating mechanism. Therefore, regardless of the magnitude of vibration that acts on the power tool, the dynamic vibration reducer can be steadily operated. As a result, a power tool is provided which can ensure a sufficient vibration reducing function even in such operating conditions in which only a small amount of vibration is inputted to the dynamic vibration reducer and the dynamic vibration reducer does not sufficiently function.

According to this invention, particularly, the second operating mechanism is provided for mechanically exciting the elastic element that applies a biasing force to the weight. Thus, the timing of excitation can be appropriately adjusted, and the phase of linear motion of the weight can be freely set. Therefore, the timing for driving the weight can be caused to coincide with the time at which an impact force is generated during operation of the tool bit, so that vibration reduction by the dynamic vibration reducer can be optimized.

In the dynamic vibration reducer, either one or more elastic elements may apply a spring force to the weight. In the latter case, at least one elastic element needs to be mechanically excited.

The dynamic vibration reducer may have specific damping characteristics such that the behavior of the dynamic vibration reducer is stabilized. Specifically, the dynamic vibration reducer may be provided with such damping characteristics that the amplitude of the weight varies within a specified amplitude range in a predetermined region of frequencies of excitation by the second operating mechanism and that the phase difference between the weight and the second operating mechanism varies within a specified phase difference range in the predetermined frequency region. In other words, it is preferable that the degrees of variations in the amplitude of the weight and the phase difference fall within respective specified ranges in a predetermined region of frequencies of excitation by the second operating mechanism. Vibration reduction by the dynamic vibration reducer becomes effective when the predetermined region of excitation frequencies covers the actual operating frequency region which is set allowing for variations in manufacturing or in use of the reciprocating power tool. Such construction is particularly effective in appropriately alleviating errors in manufacturing or in use, such as variations in the elastic coefficient of the elastic element of the dynamic vibration reducer, an error in the mass of the weight, and variations in operating frequency.

BRIEF DESCRIPTION OF THE DRAWINGS

FIG. 4 illustrates a forcible excitation model with a damping element.

FIG. 11 is a sectional view taken along line IIX-IIX in FIG. 9.

FIG. 12 is a sectional view taken along line IX-IX in FIG. 9.

REPRESENTATIVE EMBODIMENT OF THE INVENTION

First Embodiment

Figure 1:
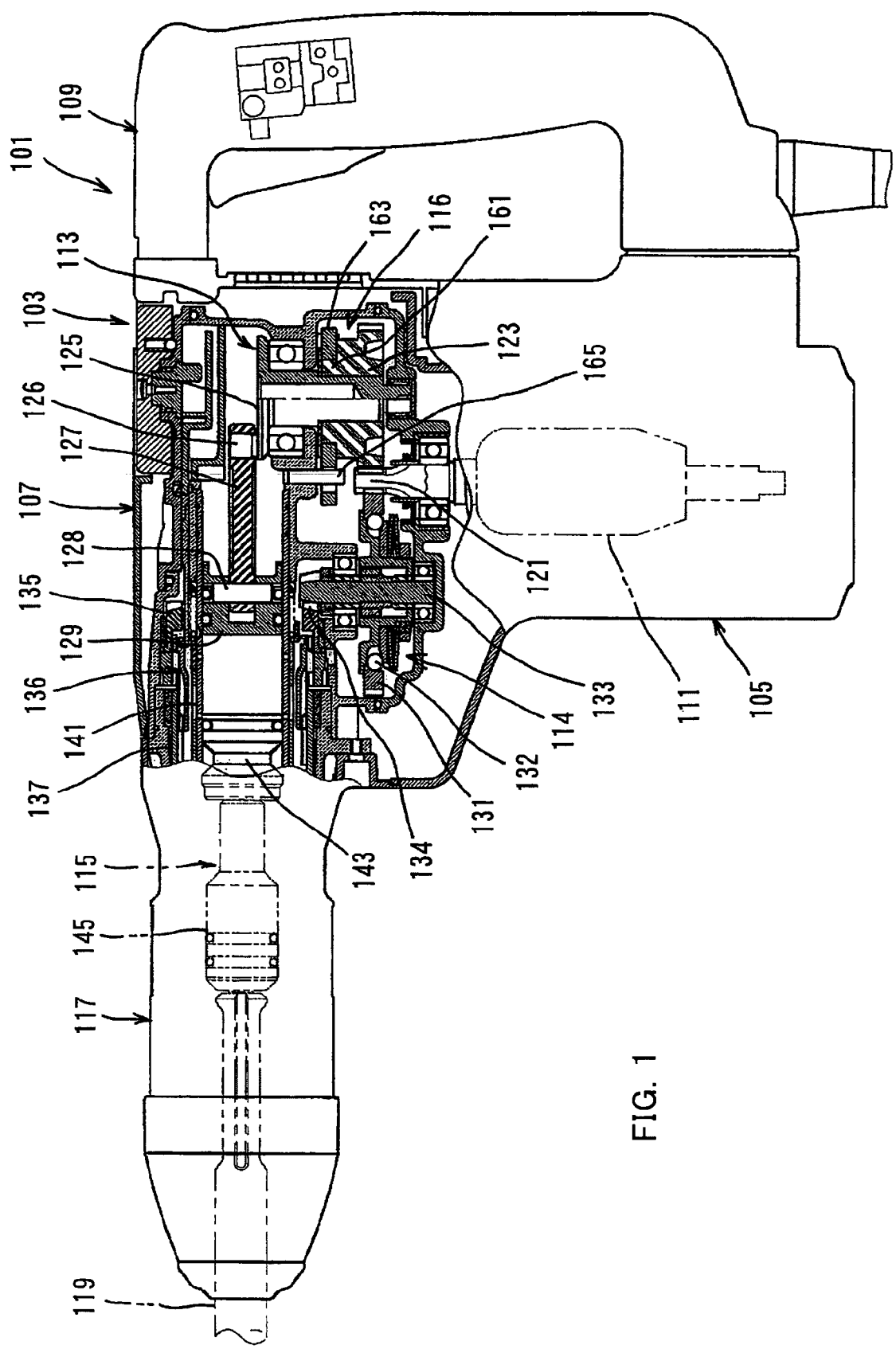
FIG. 1 is a sectional side view schematically showing an entire electric hammer drill according to a first embodiment of the invention.

A first embodiment of the present invention will now be described with reference to FIGS. 1 to 3. In this embodiment, an electric hammer drill will be explained as a representative example of a power tool according to the present invention. FIG. 1 is a sectional side view schematically showing an entire electric hammer drill 101 as a first embodiment of the power tool according to the present invention. As shown in FIG. 1, the hammer drill 101 of this embodiment mainly includes a body 103 and a hammer bit 119 detachably coupled to the tip end region of the body 103 via a tool holder 137. The hammer bit 119 is a feature that corresponds to the "tool bit" according to the present invention.

The body 103 includes a motor housing 105, a gear housing 107, a barrel section 117 and a handgrip 109. The motor housing 105 houses a driving motor 111 and the gear housing 107 houses a first motion converting mechanism 113, a power transmitting mechanism 114 and a second motion converting mechanism 116. The barrel section 117 houses a striking element 115 that includes a striker 143 and an impact bolt 145. The rotating output of the driving motor 111 is appropriately converted into linear motion via the first motion converting mechanism 113 and transmitted to the striking element 115. Then, an impact force is generated in the axial direction of the hammer bit 119 via the striking element 115. Further, the speed of the rotating output of the driving motor 111 is appropriately reduced by the power transmitting mechanism 114 and then transmitted to the hammer bit 119. As a result, the hammer bit 119 is caused to rotate in the circumferential direction. Further, the rotating output of the driving motor 111 is appropriately converted into linear motion via the second motion converting mechanism 116 and inputted into a dynamic vibration reducer 151, which will be described below, as a driving force for forcibly exciting the dynamic vibration reducer 151. The first and second motion converting mechanisms 113 and 116 are features that correspond to the "first operating mechanism" and the "second operating mechanism", respectively, according to this invention.

The first motion converting mechanism 113 includes a driving gear 121 that is rotated in a horizontal plane by the driving motor 111, a driven gear 123 that engages with the driving gear 121, a crank plate 125 that rotates together with the driven gear 123 in a horizontal plane, a crank arm 127 that is loosely connected at one end to the crank plate 125 via an eccentric shaft 126 in a position displaced a predetermined distance from the center of rotation of the crank plate 125, and a driving element in the form of a piston 129 mounted to the other end of the crank arm 127 via a connecting shaft 128. The crank plate 122, the crank arm 127 and the piston 129 form a crank mechanism which is a feature that corresponds to the "first driving mechanism" according to this invention.

The power transmitting mechanism 117 includes a driving gear 121 that is driven by the driving motor 111, a transmission gear 131 that engages with the driving gear 121, a transmission shaft 133 that is disposed coaxially with the transmission gear 131 and caused to rotate in a horizontal plane together with the transmission gear 131 via an overload interrupting slide clutch 132, a small bevel gear 134 mounted onto the transmission shaft 133, a large bevel gear 135 that engages with the small bevel gear 134, and a tool holder 137 that is caused to rotate together with the large bevel gear 135 in a vertical plane. The hammer drill 101 can be switched between hammering mode and hammer drill mode. In the hammering mode, the hammer drill 101 performs a hammering operation on a workpiece by applying only a striking force to the hammer bit 119 in its axial direction. In the hammer drill mode, the hammer drill 101 performs a hammer drill operation on a workpiece by applying a striking force in the axial direction and a rotating force in the circumferential direction to the hammer bit 119.

The striking mechanism 115 includes a striker 143 that is slidably disposed together with the piston 129 within the bore of the cylinder 141, and an impact bolt 145 that is slidably disposed within the tool holder 137 and transmits the kinetic energy of the striker 143 to the hammer bit 119.

Figure 2:
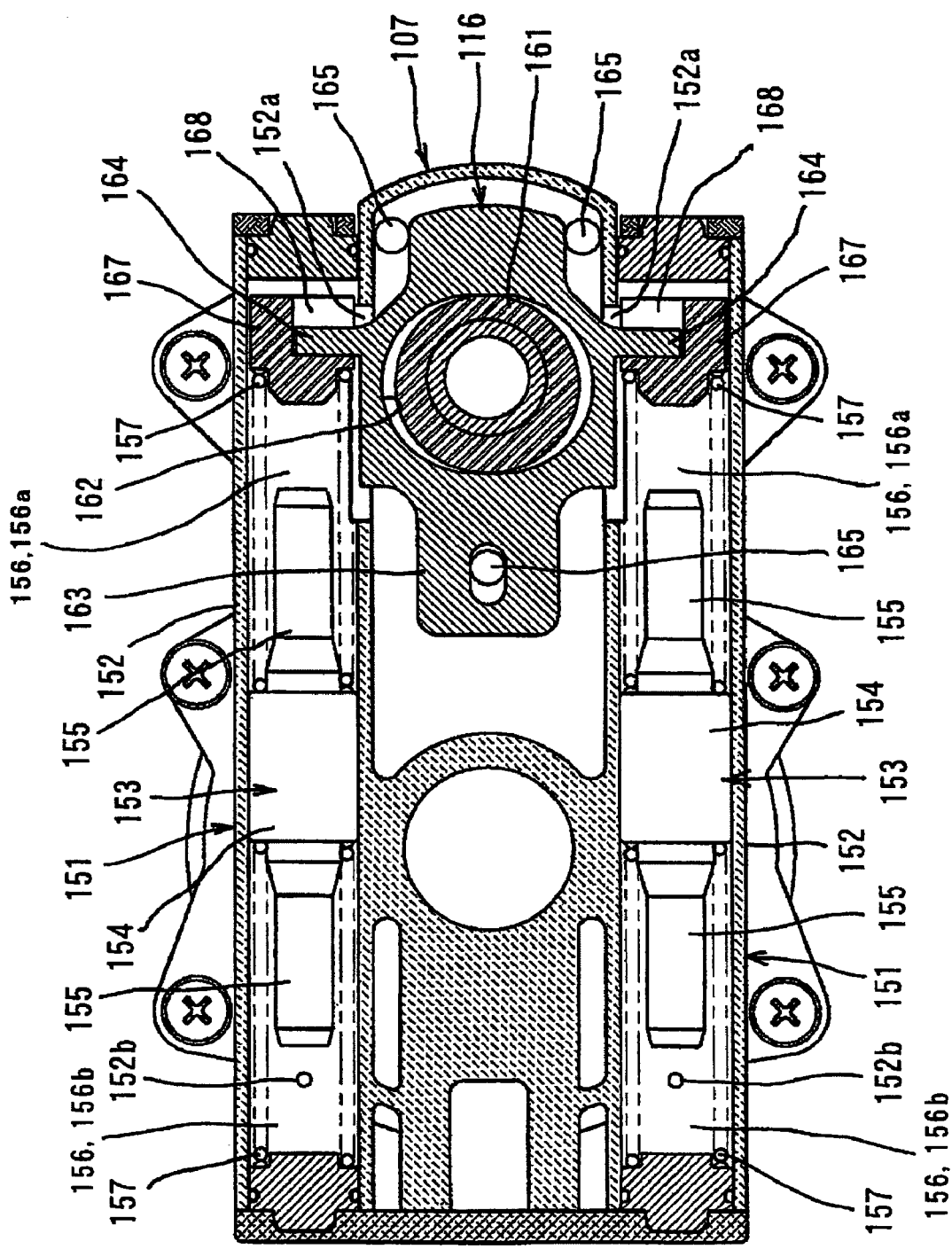
FIG. 2 is a sectional plan view showing a dynamic vibration reducer and a second motion converting mechanism that forcibly excites the dynamic vibration reducer, with a biasing spring under pressure.
Figure 3:
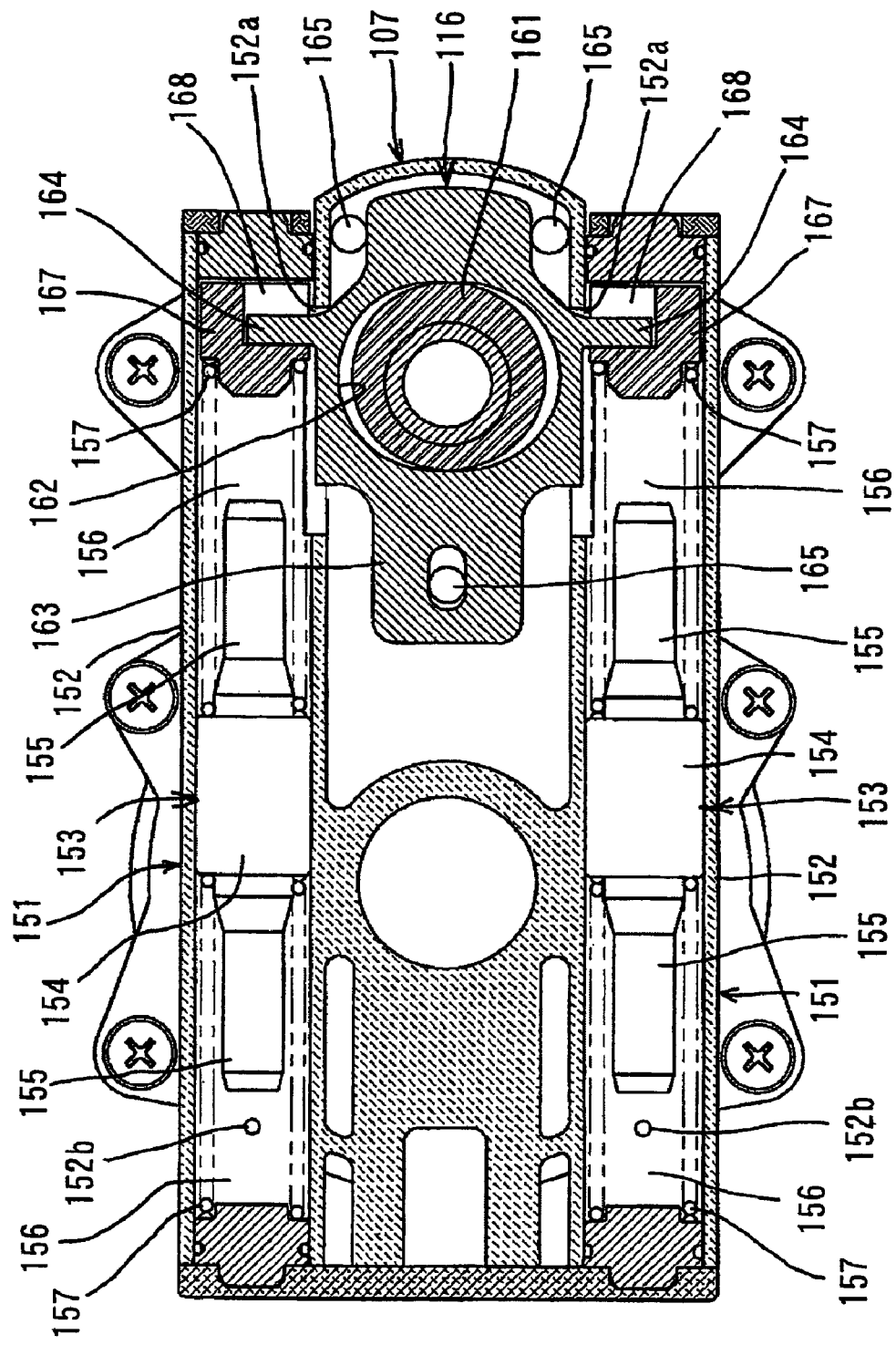
FIG. 3 is a sectional plan view showing the dynamic vibration reducer and the second motion converting mechanism that forcibly excites the dynamic vibration reducer, with the biasing spring under no pressure.

As shown in FIGS. 2 and 3, the dynamic vibration reducer 151 is connected to the body 103 of the hammer drill 101 according to this embodiment. FIGS. 2 and 3 show the dynamic vibration reducer 151 and the second motion converting mechanism 116 that forcibly excites the dynamic vibration reducer 151, in sectional plan view. The dynamic vibration reducer 151 mainly includes a cylindrical body 152 that is integrally formed with the body 103 or more specifically the gear housing 107, a weight 153 disposed within the cylindrical body 152, and biasing springs 157 disposed on the right and left sides of the weight 153. Each of the biasing springs 157 is a feature that corresponds to the "elastic element" according to the present invention. The biasing springs 157 exert a spring force on the weight 153 toward each other when the weight 153 moves in the longitudinal direction of the cylindrical body 152 (in the axial direction of the hammer bit 119). Further, an actuation chamber 156 (which is shown in FIG. 2 as right and left actuation chambers 156a and 156b) is defined on the both sides of the weight 153 within the cylindrical body 152. The actuation chamber 156 communicates with the outside of the dynamic vibration reducer 151 via an opening 152a formed through the wall of the cylindrical body 152 or via a vent 152b.

The weight 153 has a large-diameter portion 154 and a small-diameter portion 155 which are contiguous to each other. The dimensions of the weight 153 can be appropriately adjusted by selecting, for example, the contour and the longitudinal length of the large- and small-diameter portions, so that the weight 153 can be made compact in size. Further, the weight 153 is elongated in the direction of its movement and the outer periphery of the small-diameter portion 155 is in close contact with the inner periphery of the biasing spring 157. Therefore, the weight 153 can be stabilized in movement in the axial direction of the hammer bit 119.

Further, the dynamic vibration reducers 151 are disposed on the both sides of the axis of the hammer bit 119. In this embodiment, the cylindrical body 152 of each of the dynamic vibration reducers 151 is integrally formed with the body 103 (the gear housing 107), but it may be designed to be detachable from the body 103.

The second motion converting mechanism 116 is provided as a means for actively driving the dynamic vibration reducer 151 by forcibly exciting the weight 153. As shown in FIGS. 2 and 3, the second motion converting mechanism 116 mainly includes an eccentric shaft 161 formed on the driven gear 123 (see FIG. 1) of the first motion converting mechanism 113, a connecting plate 163 that reciprocates in the axial direction of the hammer bit 119 by rotation of the eccentric shaft 161, and a slider 167 that linearly moves together with the connecting plate 163 and inputs the excitation force to the biasing spring 157. The eccentric shaft 161 and the connecting plate 163 form a crank mechanism which is a feature that corresponds to the "second driving mechanism" according to this invention.

The eccentric shaft 161 has a circular cross section having its center displaced a predetermined distance from the center of rotation of the driven gear 123. The connecting plate 163 engages with the eccentric shaft 161 via an elliptical hole 162 and is guided to move linearly by a plurality of guide pins 165 mounted on the gear housing 107. Further, linkage portions 164 are provided on the both sides of the connecting plate 163 in the direction crossing the direction of movement of the connecting plate 163 and protrude laterally. Each of the linkage portions 164 extends into the cylindrical body 152 through an opening 152a formed through the wall of the cylindrical body 152 of the dynamic vibration reducer 151 and engages with an engagement recess 168 of the slider 167 disposed within the cylindrical body 152. The slider 167 supports one end (on the side of the end of the cylindrical body) of one of the biasing springs 157 and is disposed for sliding movement in the longitudinal direction of the cylindrical body 152.

Operation of the hammer drill 101 constructed as described above will now be explained. When the driving motor 111 (shown in FIG. 1) is driven, the rotating output of the driving motor 111 causes the driving gear 121 to rotate in the horizontal plane. When the driving gear 121 rotate, the crank plate 125 revolves in the horizontal plane via the driven gear 123 that engages with the driving gear 121. Then, the crank arm 127 moves in the axial direction of the hammer bit 119 while swinging in the horizontal plane, and the piston 129 mounted on the end of the crank arm 127 slidingly reciprocates within the cylinder 141. The striker 143 reciprocates within the cylinder 141 at a speed higher than the reciprocating movement of the piston 129 by the action of the air spring function within the cylinder 141 as a result of the sliding movement of the piston 129. At this time, the striker 143 collides with the impact bolt 145 and transmits the kinetic energy caused by the collision to the hammer bit 119. When the hammer drill 101 is driven in hammer drill mode, the driving gear 121 is caused to rotate by the rotating output of the driving motor 111, and the transmission gear 131 that engages with the driving gear 121 is caused to rotate together with the transmission shaft 133 and the small bevel gear 134 in a horizontal plane. The large bevel gear 135 that engages with the small bevel gear 134 is then caused to rotate in a vertical plane, which in turn causes the tool holder 137 and the hammer bit 119 held by the tool holder 137 to rotate together with the large bevel gear 135. Thus, in the hammer drill mode, the hammer bit 119 performs a hammering movement in the axial direction and a drilling movement in the circumferential direction, so that the hammer drill operation is performed on the workpiece.

When the hammer drill 101 is driven in hammer mode, a midpoint in the power transmission system, or more specifically, a clutch mechanism 136 disposed between the large bevel gear 135 and the tool holder 137 is cut off. In other words, in the hammer mode, the hammer bit 119 only performs a hammering movement in the axial direction, so that the hammering operation is performed on the workpiece.

As described above, the dynamic vibration reducer 151 mounted in the body 103 serves to reduce impulsive and cyclic vibration caused when the hammer bit 119 is driven. Specifically, the weight 153 and the biasing springs 157 serve as vibration reducing elements in the dynamic vibration reducer 151 and cooperate to passively reduce vibration of the body 103 of the hammer drill 101 on which a predetermined outside force (vibration) is exerted.

In this embodiment, when the hammer drill 101 is driven and the eccentric shaft 161 of the driven gear 123 rotates in the horizontal plane, the connecting plate 163 engaged with the eccentric shaft 161 reciprocates in the axial direction of the hammer bit 119. When the connecting plate 163 moves in one direction (toward the hammer bit 119 in this embodiment), the connecting plate 163 moves the slider 167 and presses the biasing spring 157, which in turn moves the weight 153 in the direction of pressing the biasing spring 157. Thus, the weight 153 of the dynamic vibration reducer 151 is actively driven.

In this embodiment, a spring receiving member in the form of the slider 167 is driven via the crank mechanism formed by the eccentric shaft 161 and the connecting plate 163 in order to forcibly excite the weight 153. Therefore, the timing for driving the weight 153 or the phase of the crank can be adjusted such that, in actual design, the weight 153 of the dynamic vibration reducer 151 reciprocates in a direction opposite to the striker 143 when the striker 143 collides with the impact bolt 145 and reciprocates in such a manner as to apply its impact force to the hammer bit 119. Therefore, the vibration of the hammer drill 101 can be effectively alleviated or reduced.

Further, in this embodiment, after the piston 129 starts to move toward the striker 143, the striker 143 actually starts to move linearly toward the impact bolt 145 with a slight time delay due to the compression time required for actuation of the air spring, the inertial force of the striker 143 or other similar factors. Therefore, preferably, the time at which the slider 167 presses the biasing spring 157 or the time at which an excitation force is inputted to the weight 153 is appropriately set allowing for such time delay.

Further, in this embodiment, the actuation chamber 156 is normally in communication with the outside so that air can freely flow in and out. Therefore, the reciprocating movement of the weight 153 in a direction opposite to the striker 143 is not prevented by the air flow.

According to this embodiment, in a passive vibration reducing mechanism in the form of the dynamic vibration reducer 151, the weight 153 is actively driven by the second motion converting mechanism 116 to reciprocate in a direction opposite to the reciprocating direction of the striker 143. Therefore, the dynamic vibration reducer 151 can be steadily operated regardless of the magnitude of vibration which acts upon the hammer drill 101. In other words, the weight 153 of the dynamic vibration reducer 151 can be used like a counter weight that is actively driven by a motion converting mechanism.

In particular, with the construction in which the biasing spring 157 for applying a biasing force to the weight 153 is mechanically forcibly excited via the second motion converting mechanism 116, the adjustment of the timing for driving the weight 153 or the phase adjustment can be freely made. Therefore, the weight 153 is caused to reciprocate in the direction opposite to the impact force at the time when the impact force is generated during hammering operation or hammer drill operation of the hammer bit 119, so that the vibration reducing function of the weight 153 can be performed in an optimum manner.

When forcible excitation is caused by the slider 167 that linearly drives the biasing spring 157 for applying a biasing force to the weight 153, the amount of travel of the weight 153 becomes very large with respect to the eccentricity of the eccentric shaft 161 if the force excitation frequency of the slider 167 is in the region of $[1/(2\pi) \cdot (2k/m)^{1/2}]$(Hz), wherein (k) is the spring constant of the biasing spring 157 and (m) is the mass of the weight 153. By utilizing this property, the phase of the eccentric shaft 161 is adjusted such that the weight 153 moves in a direction opposite to the striker 143. Further, the weight 153 can be moved a greater distance with a smaller eccentricity by adjusting the spring constant of the biasing spring 157, the mass of the weight 153 and the eccentricity of the eccentric shaft 161. Thus, optimum vibration reduction can be realized. Further, the amount of travel of the slider 167 that is linearly driven to input the excitation force to the biasing spring 157 can be reduced. Therefore, the installation space for the second motion converting mechanism 116 for driving the slider 167 can be saved, so that the hammer drill 101 can be effectively reduced in size.

If the dynamic vibration reducer 151 is disposed on one side of the axis of the hammer bit 119, moment will be generated around a vertical axis perpendicular to the axis of the hammer bit 119 when the weight 153 of the dynamic vibration reducer 151 is driven. According to this embodiment, the dynamic vibration reducers 151 are disposed in the same horizontal plane on the both sides of the axis of the hammer bit 119. Therefore, moments are generated on the both sides around a vertical axis perpendicular to the axis of the hammer bit 119 by movement of the weight 153 and act upon each other in such a manner as to cancel each other out. As a result, undesired generation of moment can be minimized by provision of the dynamic vibration reducer 151.

(Damping Characteristics of the Dynamic Vibration Reducer)

The cylindrical body 152 of the dynamic vibration reducer 151 is constructed such that the vent 152b controls the outflow of air pressurized in the second actuation chamber 156b during reciprocating movement of the weight 153, so that a damping force is forcibly applied to the weight 153. A "forcible excitation model with a damping element" according to the construction of the dynamic vibration reducer 151 of this embodiment will now be explained with reference to FIG. 4.

The model shown in FIG. 4 diagrammatically illustrates the construction of the dynamic vibration reducer 151 of this embodiment and uses a damping element (the vent 152b), the biasing springs 157, the weight 153 and the second motion converting mechanism 116 (the slider 167). In this construction, assuming that a excitation force $F_0 \cdot \cos(\omega t + \Delta)$ is inputted from the second motion converting mechanism 116 (the slider 167) into the biasing spring 157 (on the right side as viewed in the drawing), the dynamics can be represented by equations (1) to (4) shown in FIG. 4, and the response of the weight 153 can be represented by equations (5) to (7). In particular, from the equation (5) relating to the behavior of the weight 153, it is understood that, in theory, the amplitude of the weight 153 is multiplied by a factor of p with respect to the excitation force of the second motion converting mechanism 116 and the phase difference between the weight 153 and the second motion converting mechanism 116 is θ.

On the other hand, when the dynamic vibration reducer 151 is actually used, for example, variations in the spring constant of the biasing spring 157, an error in the mass of the weight 153, variations in operating frequency during operation of the hammer drill 101, etc. may occur. In such a case, even if the excitation frequency of the second motion converting mechanism 116 is adjusted in response to the operating frequency during operation of the hammer drill 101, the amplitude and the phase difference will vary due to the variations as described above, so that there is a limit in actually ensuring reliable vibration reducing performance. Therefore, in this invention, both the amplitude and the phase difference can be stabilized in response to the wide excitation frequency region, particularly by adjusting the damping characteristics of the weight 153, so that the behavior of the dynamic vibration reducer 151 is stabilized.

Specific steps for obtaining the damping characteristics of the weight 153 which are effective in stabilizing the amplitude and the phase difference in response to the wide excitation frequency region will now be explained.

(First Step)

In the first step, the relationship between the coefficient ρ (–) of the amplitude of the weight 153 and the excitation frequency f (Hz) of the second motion converting mechanism 116 and the relationship between the phase difference θ (°) between the weight 153 and the vibration input and the excitation frequency f (Hz) are derived based on equations (1) to (7) in FIG. 4. Further, in the first step, the coefficient ρ and the phase difference θ are considered by varying only the damping coefficient c, in order to obtain a desired damping coefficient c for stabilizing the coefficient ρ and the phase difference θ.

Figure 5:
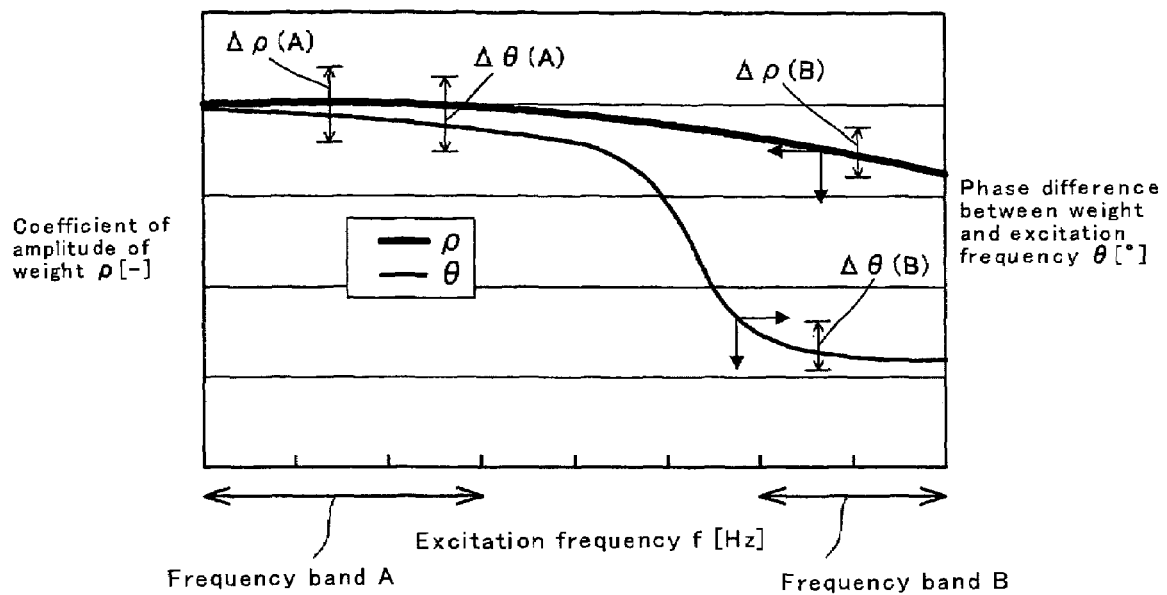
FIG. 5 is a graph of an "embodiment" showing the relationship between a coefficient ρ (−) of the amplitude of a weight 153 and an excitation frequency f (Hz) and the relationship between a phase difference θ (°) between the weight 153 and the vibration input and the excitation frequency f (Hz).

A specific example of the above-described first step will now be explained with reference to FIGS. 5 and 6. FIG. 5 is a graph of an "embodiment" showing the relationship between the coefficient ρ (–) of the amplitude of the weight 153 and the excitation frequency f (Hz) and the relationship between the phase difference θ (°) between the weight 153 and the vibration input and the excitation frequency f (Hz), and FIG. 6 is a graph of a "comparative example" with respect to the "embodiment" shown in FIG. 5.

Figure 6:
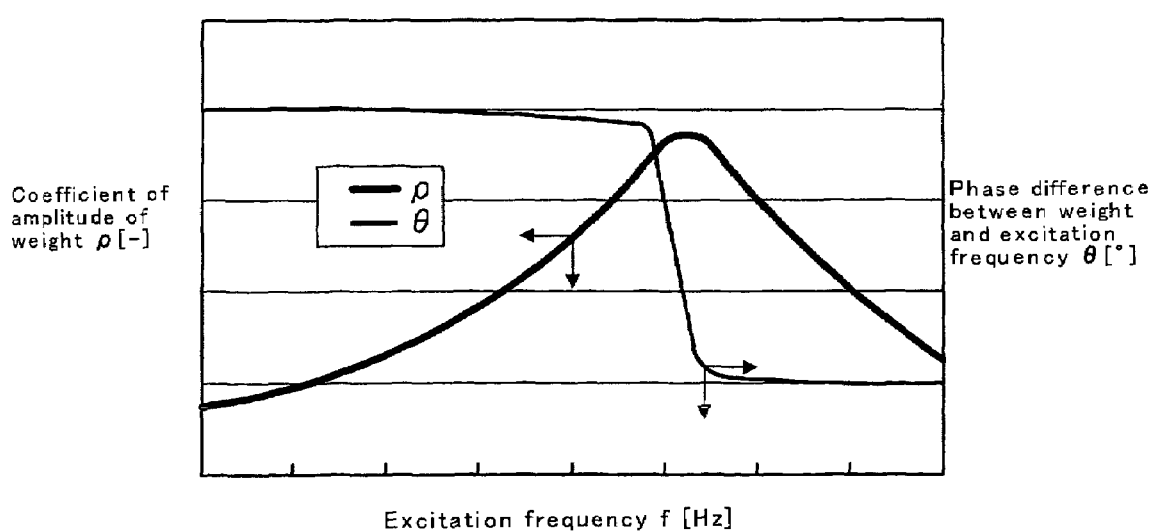
FIG. 6 is a graph of a "comparative example" with respect to the "embodiment" shown in FIG. 5.

In the "comparative example" shown in FIG. 6, any region in which both ρ and θ are stabilized with respect to the excitation frequency f, i.e. in which both of the graphs of ρ and θ become horizontal at the same time in the drawing is hardly found. Therefore, if any variations occur in manufacturing or in use, actual vibration reducing performance will be different from theoretical setting. As for the specific setting, in this case, the mass m of the weight 153 is taken as 64 (g), the spring constant k of the two biasing springs as 7.5 (N/mm), and the damping coefficient c as 0.1 (N/m).

In this embodiment, as shown in the "embodiment" of FIG. 5, it is designed to create a region in which both ρ and θ are stabilized with respect to the excitation frequency f by suitably setting a coefficient that defines the damping characteristics of the weight 153, i.e. the damping coefficient c in the equation (1) shown in FIG. 4. Specifically, the same values are used for the mass m of the weight 153 and the spring constant k of the two biasing springs as in the "comparative example" shown in FIG. 6, and only the damping coefficient c is changed from 0.1 (N/m) to 1 (N/m). In this manner, frequency bands A, B are obtained in which both ρ and θ are stabilized with respect to the excitation frequency f. In this case, when predetermined frequency regions of the excitation frequency f in the form of the frequency bands A, B cover the actual operating frequency region which is set allowing for variations in manufacturing or in use of the hammer drill 101, the vibration reduction by the dynamic vibration reducer 151 is rendered effective.

Further, in this embodiment, ρ and θ can be determined as being stable if the coefficient ρ of the amplitude varies within a specified range (for example, Δρ(A) or Δρ(B) in FIG. 5) with respect to the predetermined change of the excitation frequency f. In this embodiment, in the frequency bands A, B shown in FIG. 5, the coefficient ρ of the amplitude varies within a specified coefficient range (for example, Δρ(A) or Δρ(B) in FIG. 5) and the phase difference θ between the weight 153 and the vibration input varies within a specified range (for example, Δθ(A) or Δθ(B) in FIG. 5) with respect to the predetermined change of the excitation frequency f. Therefore, ρ and θ are determined as being stable. In this case, the specified ranges Δρ(A), Δρ(B) of the coefficient ρ of the amplitude of the weight 153 and the specified ranges Δθ(A), Δθ(B) of the phase difference θ between the weight 153 and the vibration input can be appropriately set as required, for example, to the specifications of the hammer drill 101. The frequency bands A, B correspond to the "predetermined frequency region", the amplitude ranges ($(\rho \cdot F_0)$ in the equation (5)) corresponding to the specified coefficient ranges Δρ(A), Δρ(B) correspond to the "specified amplitude range", and the specified phase difference ranges Δθ(A), Δθ(B) correspond to the "specified phase difference range", according to this invention. Further, preferably, the frequency bands A, B are set allowing for variations (typically within the range of about 5%) in manufacturing or in use, so as to have a width long enough to cover the range of the variations. Thus, in the first step, a desired damping coefficient c which can stabilize ρ and θ is obtained.

(Second Step)

In the second step, the hammer drill 101 is actually designed in response to the damping coefficient c determined in the first step. Specifically, the diameter of the vent 152b of the cylindrical body 152 of the dynamic vibration reducer 151 or the amount of air flow through the vent 152b per unit time is set such that the desired damping coefficient c determined in the first step is obtained. The diameter of the vent 152b is typically about 1.0 (mm).

In this embodiment, the design conditions obtained in the first and second steps are reflected in the configuration of the vent 152b of the hammer drill 101. According to the hammer drill 101 of this embodiment, both ρ and θ can be stabilized in response to the wide excitation frequency range, and the behavior of the dynamic vibration reducer 151 can be stabilized even if variations in manufacturing or in use occur. Thus, a reliable vibration reducing performance can be ensured in the hammer drill 101. Further, in this embodiment, the diameter of the vent 152b is set in response to the desired damping coefficient c, which is effective in simplifying the construction and the design step of the hammer drill 101.

Second Embodiment

Figure 7:
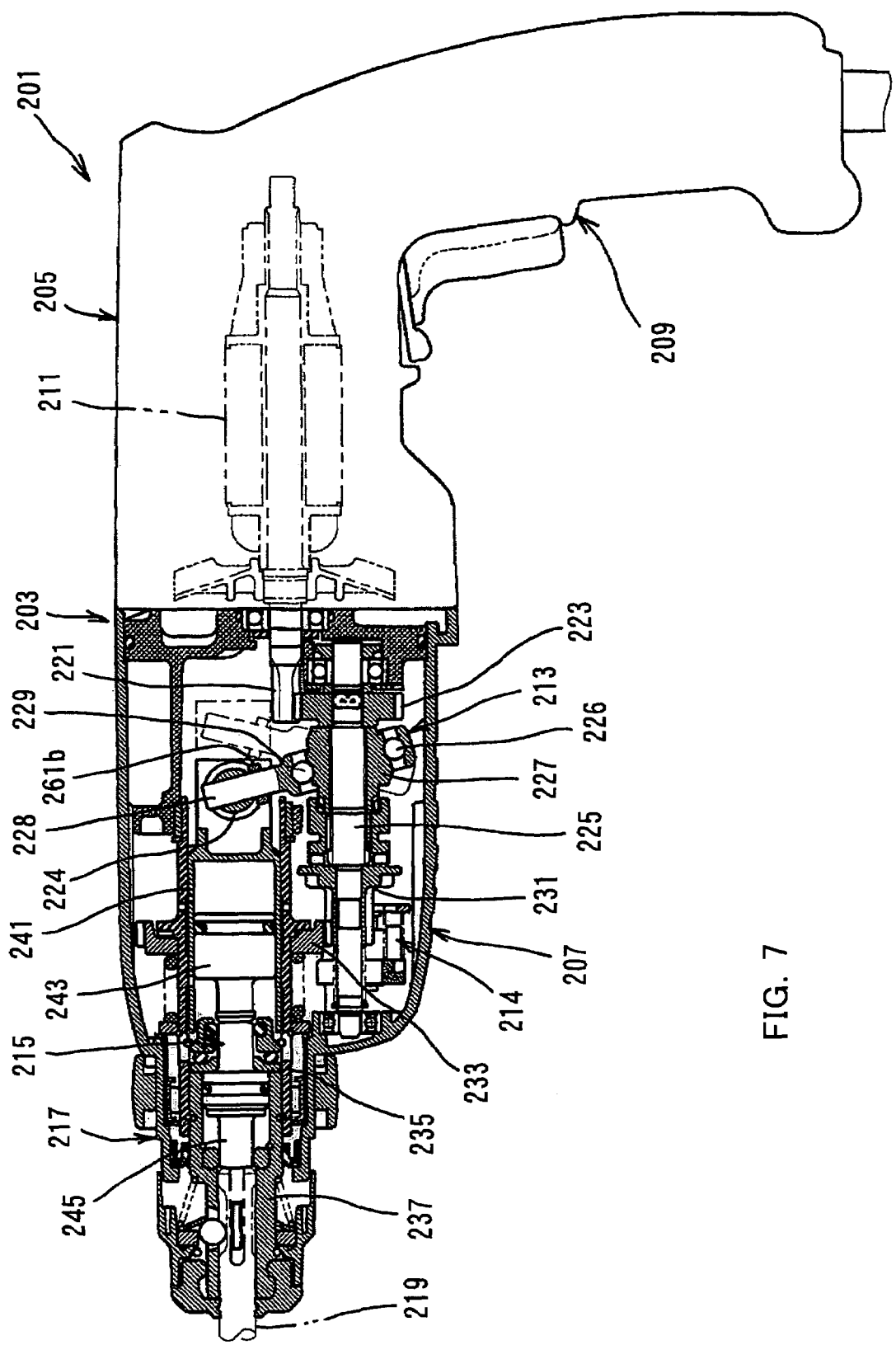
FIG. 7 is a sectional side view schematically showing an entire electric hammer drill according to a second embodiment of the invention.

A second embodiment of the present invention will now be described with reference to FIGS. 7 to 12. FIG. 7 is a sectional side view schematically showing an entire electric hammer drill 201 according to a second embodiment. As shown in FIG. 7, the hammer drill 201 of this embodiment mainly includes a body 203 and a hammer bit 219 detachably coupled to the tip end region of the body 203 via a tool holder 237. The hammer bit 219 is a feature that corresponds to the "tool bit" according to the present invention.

The body 203 includes a motor housing 205, a gear housing 207, a barrel section 217 and a handgrip 209. The motor housing 205 houses a driving motor 211 and the gear housing 207 houses a first motion converting mechanism 213, a power transmitting mechanism 214 and a second motion converting mechanism 216 (see FIGS. 8 to 12). The barrel section 217 houses a striking element 215. The rotating output of the driving motor 211 is appropriately converted into linear motion via the first motion converting mechanism 213 and transmitted to the striking element 215. Then, an impact force is generated in the axial direction of the hammer bit 219 via the striking element 215. Further, the speed of the rotating output of the driving motor 211 is appropriately reduced by the power transmitting mechanism 214 and then transmitted to the hammer bit 219. As a result, the hammer bit 219 is caused to rotate in the circumferential direction. Further, the rotating output of the driving motor 211 is appropriately converted into linear motion via the second motion converting mechanism 213 and inputted into a dynamic vibration reducer 251, which will be described below, as a driving force for forcibly exciting the dynamic vibration reducer 251. The first and second motion converting mechanisms 213 and 216 are features that correspond to the "first operating mechanism" and the "second operating mechanism", respectively, according to this invention.

The first motion converting mechanism 213 includes a driving gear 221 that is rotated in a vertical plane by the driving motor 211, a driven gear 123 that engages with the driving gear 221, a rotating element 227 that rotates together with the driven gear 223 via a driven shaft 225, a swinging ring 229 that is caused to swing in the axial direction of the hammer bit 219 by rotation of the rotating element 227, and a cylinder 241 that is caused to reciprocate by swinging movement of the swinging ring 229. The driven shaft 225 is disposed parallel (horizontally) to the axial direction of the hammer bit 219. The outer surface of the rotating element 227 fitted onto the driven shaft 225 is inclined at a predetermined angle with respect to the axis of the driven shaft 225. The swinging ring 229 is fitted on the inclined outer surface of the rotating element 227 via a bearing 226 such that it can rotate with respect to the rotating element 227. The swinging ring 229 is caused to swing in the axial direction of the hammer bit 219 by rotation of the rotating element 227. Further, the swinging ring 229 has a swinging rod 228 extending upward (in the radial direction) from the swinging ring 229. The swinging rod 228 is loosely fitted in an engaging member 224 that is formed in the rear end portion of the cylinder 241. The rotating element 227, the swinging ring 229 and the cylinder 241 form a swinging mechanism, which is a feature that corresponds to the "first driving mechanism" according to this invention.

The power transmitting mechanism 214 includes a first transmission gear 231 that is caused to rotate in a vertical plane by the driving motor 211 via the driving gear 221 and the rotating shaft 225, a second transmission gear 233 that engages with the first transmission gear 231, a sleeve 235 that is caused to rotate together with the second transmission gear 233, and a tool holder 237 that is caused to rotate together with the sleeve 235 in a vertical plane. The hammer drill 201 of the second embodiment is constructed to perform a hammer drill operation on a workpiece by applying a striking force to the hammer bit 219 in the axial direction and a rotating force in the circumferential direction.

The striking mechanism 215 includes a striker 243 that is slidably disposed within the bore of the cylinder 241, and an impact bolt 245 that is slidably disposed within the tool holder 237 and is adapted to transmit the kinetic energy of the striker 243 to the drill bit 219. The striker 243 is a feature that corresponds to the "striker" according to this invention.

Figure 8:
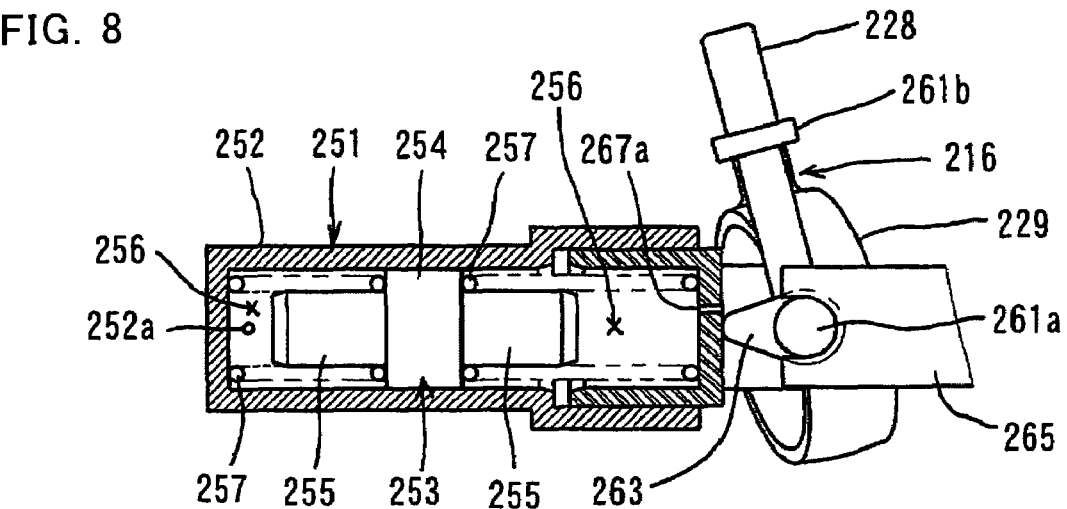
FIG. 8 is a sectional plan view showing a dynamic vibration reducer according to the second embodiment and a second motion converting mechanism that forcibly excites the dynamic vibration reducer, with a biasing spring under maximum pressure.
Figure 9:
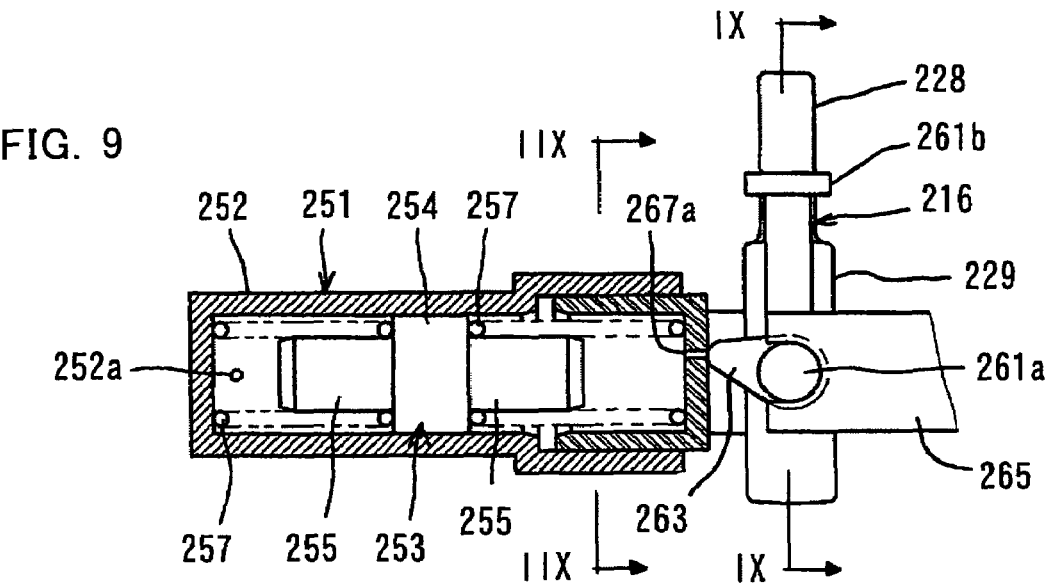
FIG. 9 is a sectional plan view showing the dynamic vibration reducer according to the second embodiment and the second motion converting mechanism that forcibly excites the dynamic vibration reducer, with the biasing spring under medium pressure.
Figure 10:
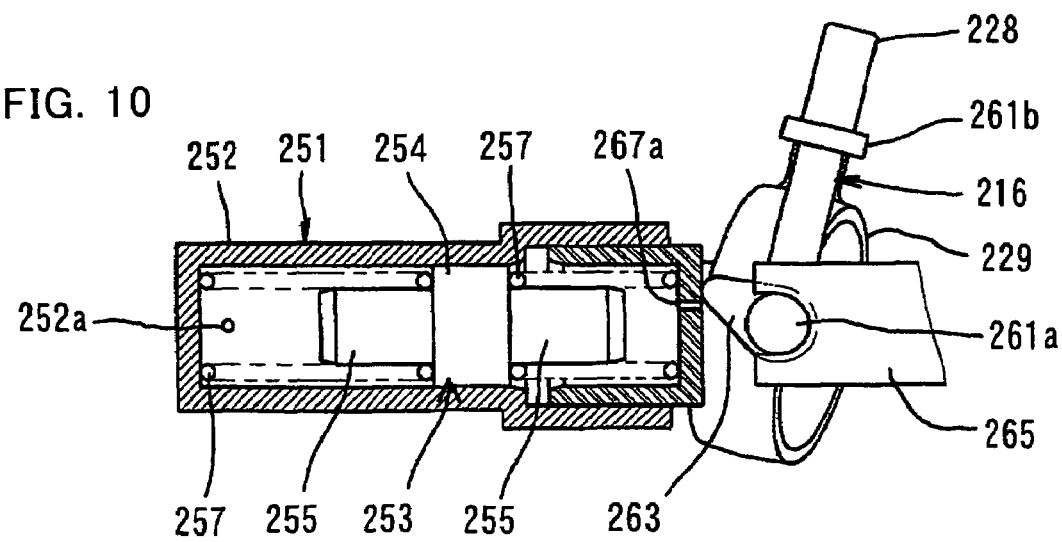
FIG. 10 is a sectional plan view showing the dynamic vibration reducer according to the second embodiment and the second motion converting mechanism that forcibly excites the dynamic vibration reducer, with the biasing spring under no pressure.

FIGS. 8 to 12 show a pair of dynamic vibration reducers 251 and the second motion converting mechanism 216 that forcibly excites the dynamic vibration reducers 151. The dynamic vibration reducers 251 are disposed on the both sides of the axis of the hammer bit 119. As shown in FIGS. 8 to 10, each of the dynamic vibration reducers 251 mainly includes a cylindrical body 252 that is integrally formed with the body 203 or more specifically the gear housing 207, a weight 253 disposed within the cylindrical body 252, and biasing springs 257 disposed on the both sides of the weight 253. Each of the biasing springs 257 is a feature that corresponds to the "elastic element" according to the present invention. The biasing springs 257 exert a spring force on the weight 253 toward each other when the weight 253 moves in the longitudinal direction of the cylindrical body 252 (in the axial direction of the hammer bit 219).

In this embodiment, the cylindrical body 252 of each of the dynamic vibration reducers 251 is integrally formed with the body 203 (the gear housing 207), but it may be designed to be detachable from the body 203.

The second motion converting mechanism 216 is provided as a means for inputting excitation force in order to actively drive and forcibly excite the weight 253 of the dynamic vibration reducer 251. The second motion converting mechanism 216 mainly includes a swinging rod 228 for the swinging ring 229 of the first motion converting mechanism 213, a swinging member 261 that swings together with the swinging rod 228, an operating piece 263 mounted on the swinging member 261, and a slider 267 the is caused to linearly move by the operating piece 263 and mechanically excites one of the biasing springs 257 of the dynamic vibration reducer 251. The swinging ring 229, the swinging member 261 and the operating piece 263 form a swinging mechanism, which is a feature that corresponds to the "second driving mechanism" according to this invention.

As shown in FIG. 12, the swinging member 261 is generally semicircular and disposed astride the upper side of the swinging ring 229. Further, a central portion 261b of the swinging member 261 in the circumferential direction is fitted onto the swinging rod 228 for relative rotation on the axis of the swinging rod 228. Further, circular stems 261a are formed on the both ends of the swinging member 261 and supported by a holder 265 such that it can rotate on a horizontal axis perpendicular to the axis of the driven shaft 225. Therefore, when the swinging ring 229 swings, the swinging member 261 swings on the stems 261a in the axial direction of the hammer bit 219.

The slider 267 of the dynamic vibration reducer 251 is fitted into the cylindrical body 252 such that it can slide in the longitudinal direction of the cylindrical body 252 (in the axial direction of the hammer bit 219). The slider 257 supports one end of one of the biasing springs 257. The both ends of the swinging member 261 are opposed to the associated sliders 267, and the operating piece 263 is provided on each of the ends. The end of the operating piece 263 is in contact with the back of the spring support surface of the slider 267 and moves the slider 267 in a direction of pressing the biasing spring 257.

An actuation chamber 256 is defined on the both sides of the weight 253 within the cylindrical body 252. The actuation chamber 256 communicates with the outside of the dynamic vibration reducer 251 via a vent 252a formed through the wall of the cylindrical body 252 or via a vent 267a formed through the slider 267. Thus, the actuation chamber 156 is normally in communication with the outside so that air can freely flow in and out. Therefore, the reciprocating movement of the weight 253 in a direction opposite to the striker 243 is not prevented by the air flow.

Further, the slider 267 has a cylindrical shape elongated in the direction of movement and having a closed end in the direction of movement. Therefore, the slider 267 can have a wider sliding contact area without increasing the longitudinal length of the cylindrical body 252. Thus, the movement of the slider 267 in the longitudinal direction can be stabilized.

Operation of the hammer drill 201 of the second embodiment constructed as described above will now be explained. When the driving motor 211 (shown in FIG. 7) is driven, the rotating output of the driving motor 211 causes the driving gear 221 to rotate in a vertical plane. When the driving gear 221 rotate, the rotating element 227 is caused to rotate in a vertical plane via the driven gear 223 that engages with the driving gear 221 and the driven shaft 225. The swinging ring 229 and the swinging rod 228 then swing in the axial direction of the hammer bit 219. Then the cylinder 241 is caused to linearly slide by the swinging movement of the swinging rod 228. By the action of the air spring function within the cylinder 241 as a result of this sliding movement of the cylinder 241, the striker 243 reciprocates within the cylinder 241 at a speed higher than the reciprocating movement of the cylinder 241. At this time, the striker 243 collides with the impact bolt 245 and transmits the kinetic energy caused by the collision to the hammer bit 219.

When the first transmission gear 231 is caused to rotate together with the driven shaft 225, the sleeve 235 is caused to rotate in a vertical plane via the second transmission gear 233 that engages with the first transmission gear 231, which in turn causes the tool holder 237 and the hammer bit 219 held by the tool holder 237 to rotate together with the sleeve 235. Thus, the hammer bit 219 performs a hammering movement in the axial direction and a drilling movement in the circumferential direction, so that the hammer drill operation is performed on the workpiece.

As described above, the dynamic vibration reducer 251 mounted in the body 203 serves to reduce impulsive and cyclic vibration caused when the hammer bit 219 is driven. When the hammer drill 201 is driven and the swinging ring 229 swings, the swinging member 261 swings in the axial direction of the hammer bit 219. Then the operating piece 263 on the swinging member 261 vertically swings. When the operating piece 263 swings in one direction (downward in this embodiment), the operating piece 263 linearly moves the slider 267 of the dynamic vibration reducer 251 and presses the biasing spring 257, which in turn moves the weight 253 in the direction of pressing the biasing spring 257. Specifically, the weight 253 can be actively driven and forcibly excited. Therefore, like the first embodiment, the dynamic vibration reducer 251 can be steadily operated regardless of the magnitude of vibration which acts upon the hammer drill 201.

Further, with the construction in which the biasing spring 257 is mechanically forcibly excited by the second motion converting mechanism 216, like in the first embodiment, the adjustment of the timing for driving the weight 253 or the phase adjustment can be freely made. Thus, the vibration reducing function of the weight 253 can be performed in an optimum manner.

The construction and the designing technique of the damping mechanism using the vent 152b in the first embodiment can also be applied as-is in the second embodiment.

In the first and second embodiments, the hammer drills 101, 201 are described as a representative example of the power tool in the present invention. However, the present invention is not limited to the hammer drills 101, 201, but may be applied to hammers and also to any power tool which performs an operation on a workpiece by linearly moving a tool bit, suitably including a jigsaw and a reciprocating saw which perform a cutting operation on a workpiece by reciprocating a saw blade.

(Modification to the Elastic Element)

Figure 13:
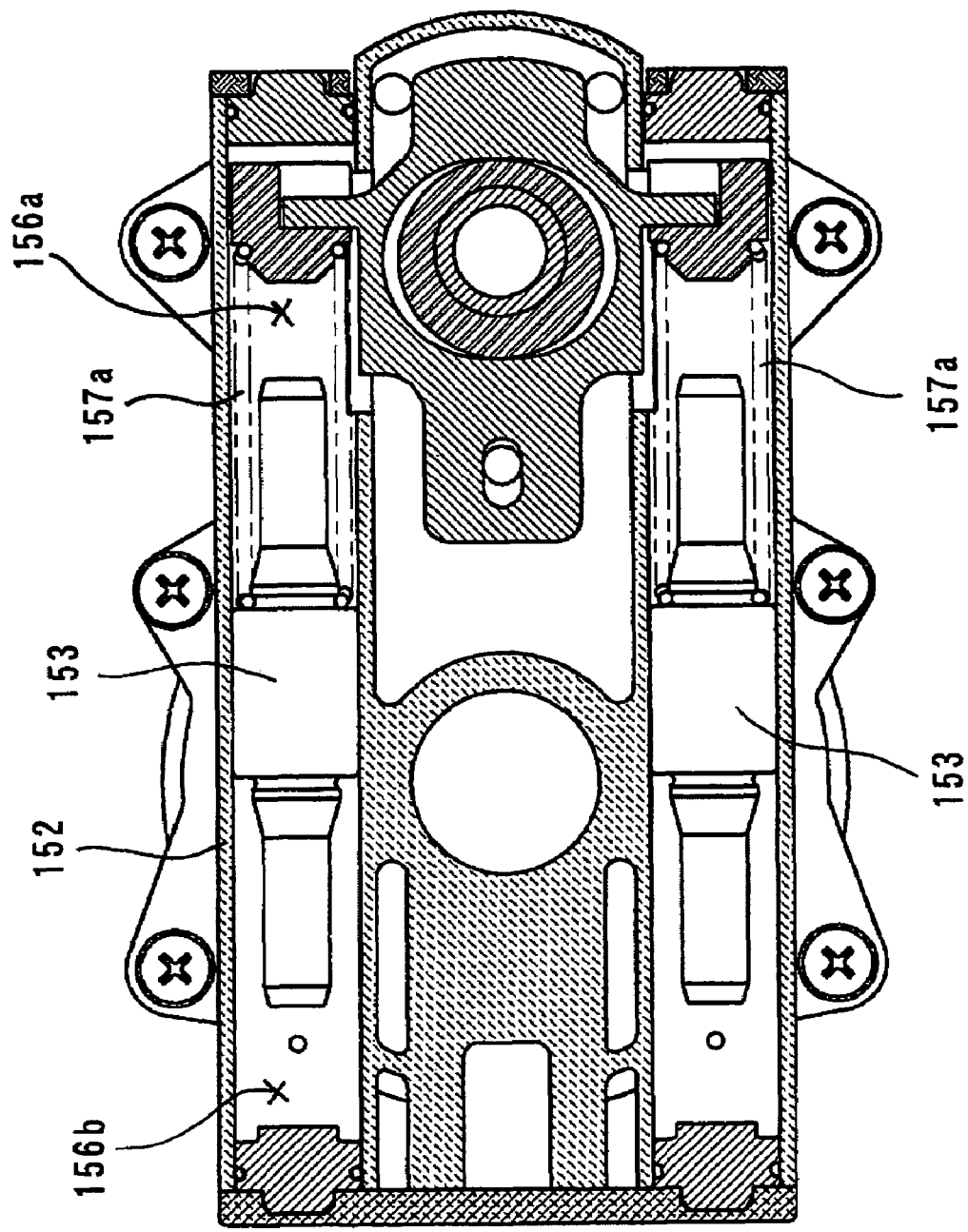
FIG. 13 is a schematic view showing the construction of a modification to the first embodiment.
Figure 14:
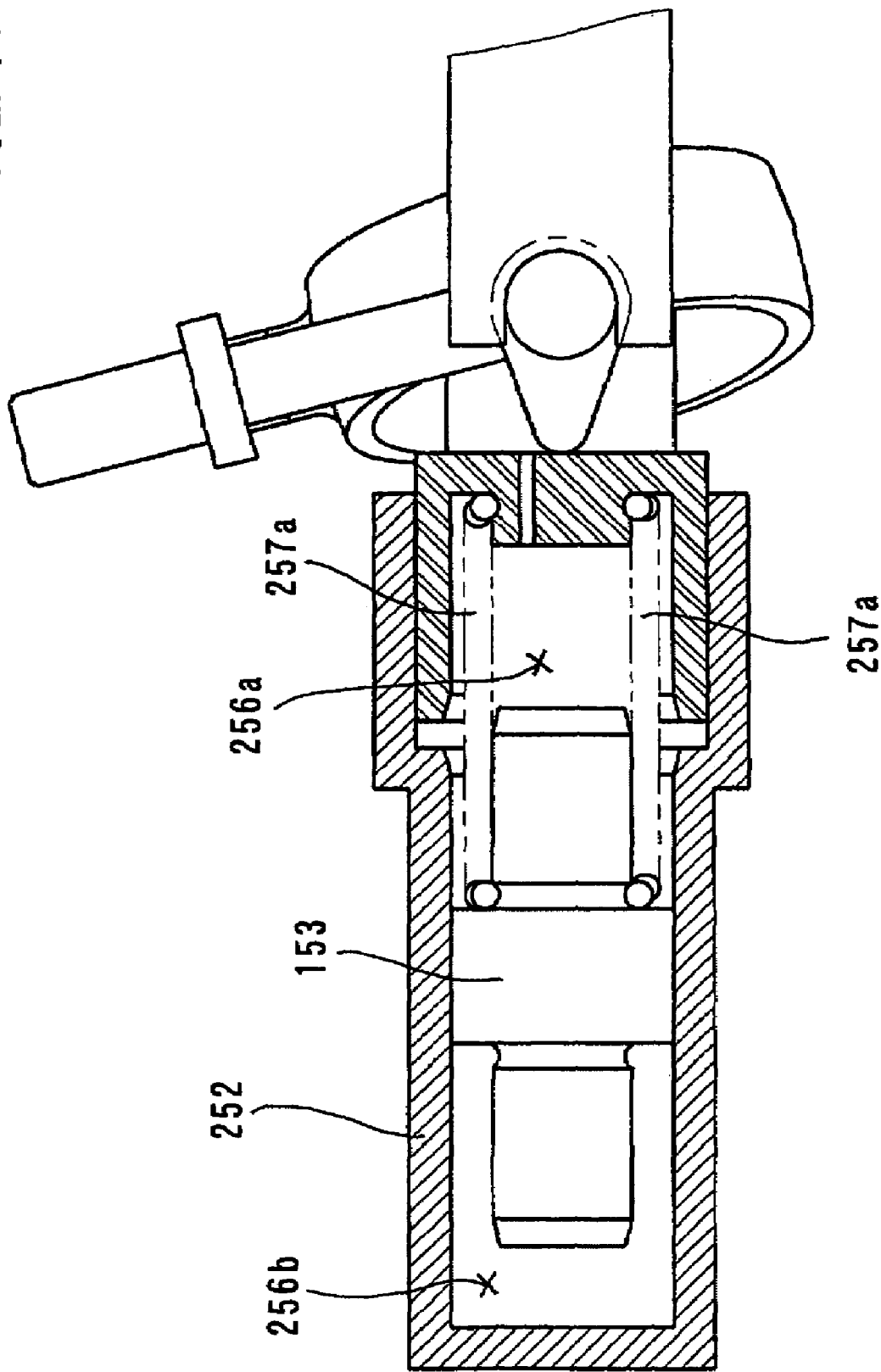
FIG. 14 is a schematic view showing the construction of a modification to the second embodiment.

In the first and second embodiments, the biasing springs 157, 257 are disposed on the both sides of the weights 153, 253. In this respect, as shown in FIGS. 13 and 14, biasing springs 157a, 257a may be disposed in actuation chambers 156a, 256a formed on the right side of the weights 153, 253, without any spring in actuation chambers 156b, 256b formed on the left side. In this case, preferably, provision is made for the weights 153, 253 to come into surface contact with the inner surface of the cylindrical bodies 152, 252, so that the weights 153, 253 can slide with stability. According to this modification, the dynamic vibration reducers 151, 251 can be further simplified in structure.

DESCRIPTION OF NUMERALS 101 hammer drill (power tool)
103 body
105 motor housing
107 gear housing
109 handgrip
111 driving motor
113 first motion converting mechanism (first operating mechanism)
114 power transmitting mechanism
115 striking element
116 second motion converting mechanism (second operating mechanism)
117 barrel section
119 hammer bit (tool bit)
121 driving gear
123 driven gear
125 crank plate
126 eccentric shaft (first driving mechanism)
127 crank arm (first driving mechanism)
128 connecting shaft
129 piston (first driving mechanism)
131 transmission gear
132 slide clutch
133 transmission shaft
134 small bevel gear
135 large bevel gear
136 clutch mechanism
137 tool holder
141 cylinder
143 striker
145 impact bolt
151 dynamic vibration reducer
152 cylindrical body
153 weight
154 large-diameter portion
155 small-diameter portion
156 actuation chamber
157 biasing spring (elastic element)
161 eccentric shaft (second driving mechanism)
162 elliptical hole
163 connecting plate (second driving mechanism)
164 linkage portion
165 guide pin
167 spring receiving member
168 engagement recess

The invention claimed is:

1. A power tool comprising:
   a tool bit;
   a driving motor;
   a first operating mechanism that linearly drives the tool bit and thereby causes the tool bit to perform a predetermined operation, the first operating mechanism including:
      a first driving mechanism that converts a rotating output of the driving motor into a linear motion in the axial direction of the tool bit; and
      a striker that is caused to reciprocate by the first driving mechanism and thereby drives the tool bit;
   a dynamic vibration reducer that reduces vibration in the operation of the tool bit via a weight that reciprocates under the action of a biasing force of an elastic element; and
   a second operating mechanism that mechanically excites the elastic element to thereby forcibly drive the weight, the second operating mechanism including:
      a second driving mechanism that converts a rotating output of the driving motor into a linear motion in the axial direction of the tool bit; and
      a slider that is caused to reciprocate by the second driving mechanism and thereby excites the elastic element.

2. The power tool as defined in claim 1, wherein the elastic element is defined as a plurality of elastic elements that connect the weight to a body of the power tool, and the second operating mechanism is designed to mechanically excite at least one of the elastic elements.

3. The power tool as defined in claim 1, wherein:
   the tool bit is designed as a hammer bit that performs the operation by applying a linear impact force to the workpiece.

4. The power tool as defined in claim 1, wherein two dynamic vibration reducers are disposed on either side of an axis of the tool bit.

5. The power tool as defined in claim 1, wherein the dynamic vibration reducer has such damping characteristics that, when the second operating mechanism excites the elastic element, the amplitude of the weight varies within a specified amplitude range in a predetermined frequency region of excitation frequencies and that the phase difference between the weight and the second operating mechanism varies within a specified phase difference range in the predetermined frequency region, so that the behavior of the dynamic vibration reducer is stabilized.

6. The power tool as defined in claim 5, wherein the dynamic vibration reducer has a housing in which the weight is slidably disposed and a vent that is formed through the housing and provides communication between an inside region and an outside region of the housing, thereby allowing air flow between the regions, the amount of air flow through the vent per unit time being set in response to the damping characteristics.

7. The power tool as defined in claim 1, wherein the excitation frequency is substantially set at $1/(2\pi) \cdot (2k/m)^{1/2}$ Hz, wherein k is the elastic constant of the biasing spring and m is the mass of the weight in the dynamic vibration reducer, such that linear momentum of the weight is increased.

8. The power tool as defined in claim 1, wherein the second operating mechanism includes a crank mechanism that converts a rotating output of the driving motor into a linear motion in the axial direction of the tool bit.

9. The power tool as defined in claim 1, wherein the first operating mechanism includes a swinging mechanism that converts a rotating output of the driving motor into a linear motion in the axial direction of the tool bit, and the second operating mechanism includes an operating piece that is connected to the swinging mechanism and the elastic element in order to mechanically excite the elastic element by components of movement in the axial direction of the tool bit in the swinging movement of the swinging mechanism.

10. The power tool as defined in claim 9, wherein the operating piece functions as a cam element that transmits the components of movement in the axial direction of the tool bit in the swinging movement of the swinging mechanism, to the elastic element.

11. A power tool comprising:
a tool bit;
a driving motor;
a first operating mechanism that linearly drives the tool bit and thereby causes the tool bit to perform a predetermined operation, the first operating mechanism including:
    a first driving mechanism that converts a rotating output of the driving motor into a linear motion in the axial direction of the tool bit; and
    a slider that cooperates with the tool bit and is caused to reciprocate by the first driving mechanism, thereby reciprocating the tool bit;
a dynamic vibration reducer that reduces vibration in the operation of the tool bit via a weight that reciprocates under the action of a biasing force of an elastic element; and
a second operating mechanism that mechanically excites the elastic element to thereby forcibly drive the weight, the second operating mechanism including:
    a second driving mechanism that converts a rotating output of the driving motor into a linear motion; and
    a slider that is caused to reciprocate by the second driving mechanism, thereby exciting the elastic element.

12. The power tool as defined in claim 11, wherein:
the tool bit is designed as a saw blade that performs a cutting operation on a workpiece by a reciprocating movement.

13. A power tool comprising:
a tool bit;
a first operating mechanism that drives the tool bit to reciprocate and thereby causes the tool bit to perform a predetermined operation;
a dynamic vibration reducer that includes an elastic element and a weight that can reciprocate under the action of a biasing force of the elastic element; and
a second operating mechanism that forcibly excites and drives the weight,
wherein:
    the dynamic vibration reducer has such damping characteristics that the amplitude of the weight varies within a specified amplitude range in a predetermined frequency region of excitation frequencies of excitation by the second operating mechanism and that the phase difference between the weight and the second operating mechanism varies within a specified phase difference range in the predetermined frequency region, so that the behavior of the dynamic vibration reducer is stabilized; and
    the dynamic vibration reducer has a housing in which the weight is slidably disposed and a vent that is formed through the housing and provides communication between an inside region and an outside region of the housing, thereby allowing air flow between the regions, the amount of air flow through the vent per unit time being set in response to the damping characteristics.

14. The power tool as defined in claim 13, wherein two dynamic vibration reducers are disposed on either side of an axis of the tool bit.

* * * * *